G. R. TREVILLIAN.
APPARATUS FOR THE MOLDING OF PLASTIC MATERIALS.
APPLICATION FILED MAY 21, 1917. RENEWED SEPT. 24, 1919.

1,342,192.

Patented June 1, 1920.
9 SHEETS—SHEET 1.

Witness:
Harry S. Gaither

Inventor:
Guy R. Trevillian

G. R. TREVILLIAN.
APPARATUS FOR THE MOLDING OF PLASTIC MATERIALS.
APPLICATION FILED MAY 21, 1917. RENEWED SEPT. 24, 1919.

1,342,192.

Patented June 1, 1920.
9 SHEETS—SHEET 6.

Witness:
Harry S. Gaither

Inventor:
Guy R. Trevillian
by Clemming & Clemming
Attys

Fig. 9.

G. R. TREVILLIAN.
APPARATUS FOR THE MOLDING OF PLASTIC MATERIALS.
APPLICATION FILED MAY 21, 1917. RENEWED SEPT. 24, 1919.

1,342,192.

Patented June 1, 1920.
9 SHEETS—SHEET 8.

Witness:
Harry S. Gaither

Inventor:
Guy R. Trevillian
by Banning & Banning
Attys

UNITED STATES PATENT OFFICE.

GUY R. TREVILLIAN, OF CICERO, ILLINOIS.

APPARATUS FOR THE MOLDING OF PLASTIC MATERIALS.

1,342,192.  Specification of Letters Patent.  Patented June 1, 1920.

Application filed May 21, 1917, Serial No. 169,925. Renewed September 24, 1919. Serial No. 325,990.

*To all whom it may concern:*

Be it known that I, GUY R. TREVILLIAN, a citizen of the United States, residing at Cicero, Cook county, Illinois, have invented certain new and useful Improvements in Apparatus for the Molding of Plastic Materials, of which the following is a specification.

This invention relates to a machine for molding plastic materials, such as are used in the manufacture of tile, bricks, coping, etc., and has particular reference to the several mechanisms, and their construction and mode of operation, by which the material is transformed into a product of definite shape.

In the manufacture of various molded products, it has been found difficult, if not impossible, to provide machinery capable of operating upon a plastic material to produce the desired density, form, and finish. In the manufacture of roofing tile, for instance, it is customary to mold certain plastic ingredients by hand with the aid of a palette and bar having the desired profiles, and thereafter setting the molded product, still on its palette, away to be cured. Such a method of molding is necessarily slow, requiring the employment of many operators where quantity production is desired, and entails further the use of a large number of palettes.

Recognizing the difficulties and deficiencies attendant upon such methods of production, I have devised a machine capable of automatically shaping products to a desired form or profile. In the present apparatus, the material to be molded is poured upon palettes which are carried upon an endless conveyer into successive contact with the different agencies which perform work upon the material. It is the construction of such a machine, the arrangement and operation of its constituent parts which operate upon the material, and the steps or processes by which the material is brought to its final density, form, and finish, that constitute the subject matter of my invention.

In the drawings, which illustrate a preferred embodiment of my invention and which represent a machine designed particularly for the manufacture of tile having a conventional profile:—

Figure 1:
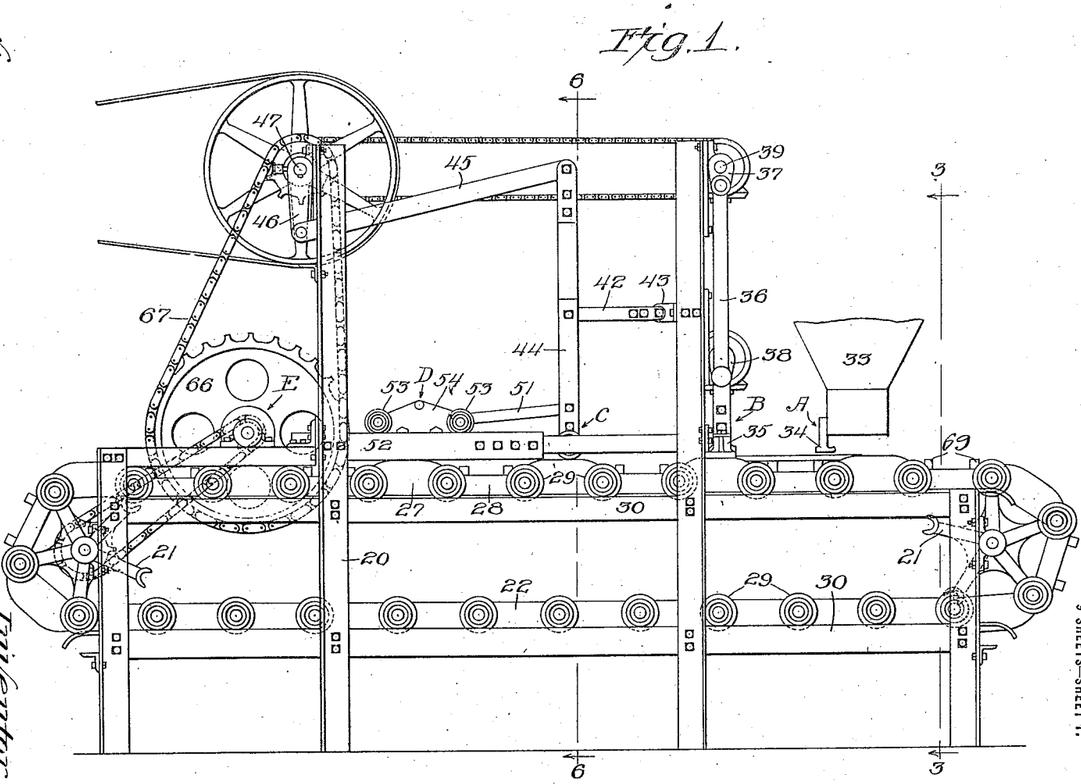
Figure 1 is a general side elevation of the machine in its entirety.

The arrangement of the various mechanisms composing my invention, and their relation to each other and to the entire machine, may best be understood by referring to Fig. 1, wherein is shown a framework 20 equipped with suitable wheels 21 for an endless conveyer 22 upon which a number of palettes 23 containing thereon material to be molded are carried into positions to be individually and successively operated upon by (1) leveling mechanism A, (2) tamping mechanism B, (3) troweling mechanism C, (4) smoothing mechanism D, and (5) finishing mechanism E. The descriptive terms used to designate the five sets of mechanism just mentioned are apt to a certain degree only, so that it will be understood these terms are employed principally for convenience.

*The product.*

Figure 13:
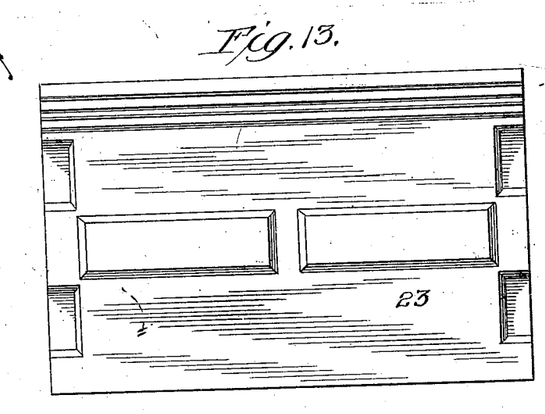
Figs. 13, 14, and 15 are plan, side, and end views, respectively, of a palette suitable for the apparatus.
Figures 14, 15:
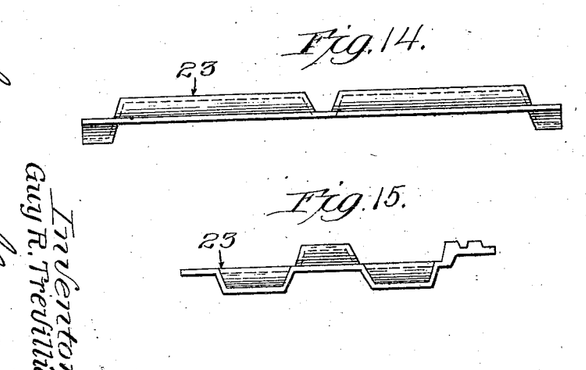
Figure 16:
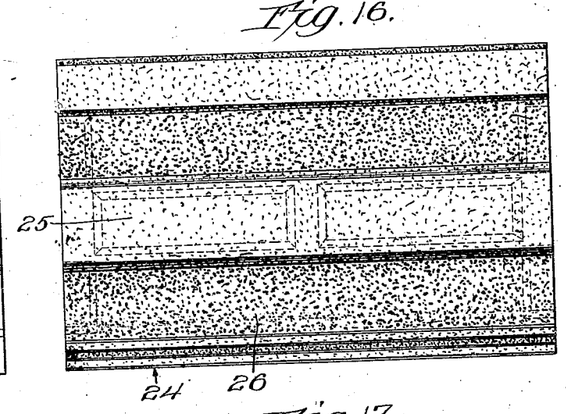
Figs. 16, 17, and 18 are plan, side, and end views, respectively, of the molded product formed on the palette of the profile illustrated in Figs. 13, 14, and 15.
Figure 17:
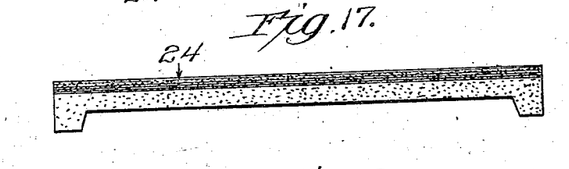
Figure 18:
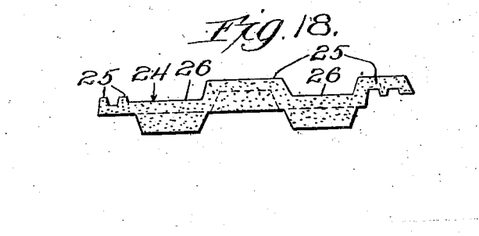

Before proceeding further, it may be advisable to explain the nature of the palette used and the shape or form of the product which is molded on the palette. It should be borne in mind that palettes are made up in many different profiles and that any approved design or pattern may be used with my machine. The palette profile illustrated in detail in Figs. 13, 14, and 15 represents a conventional design, and may consist of a plate, either molded or stamped, having the desired configurations. In the molding process these configurations are imparted to the product on its under side. The profile of the reverse or upper side of the product will take on the form of the mold which engages that side. For the purpose of clearly illustrating the operation of my invention, I have shown in Figs. 16, 17, and 18 a molded product 24 having its upper side, not in contact with the palette, formed with ridges 25 and intermediate recesses 26, extending from end to end. It is the various mechanisms and processes by which a product of such configuration is formed that I have illustrated in the drawings and will now proceed to describe as an exemplification of my invention.

*The conveyer.*

Figures 2, 19:
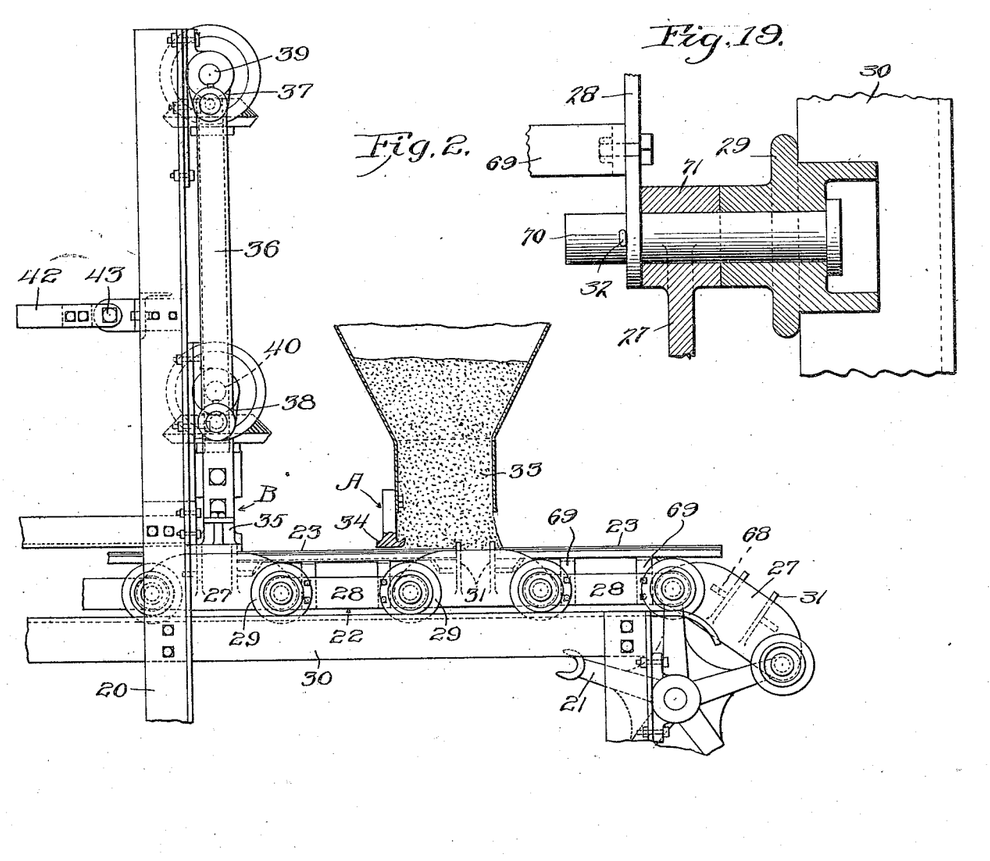
Fig. 2 is an enlarged side elevation of the receiving end of the machine.
Fig. 19 is a detail in cross section of certain parts appearing in Fig. 9.
Figure 7:
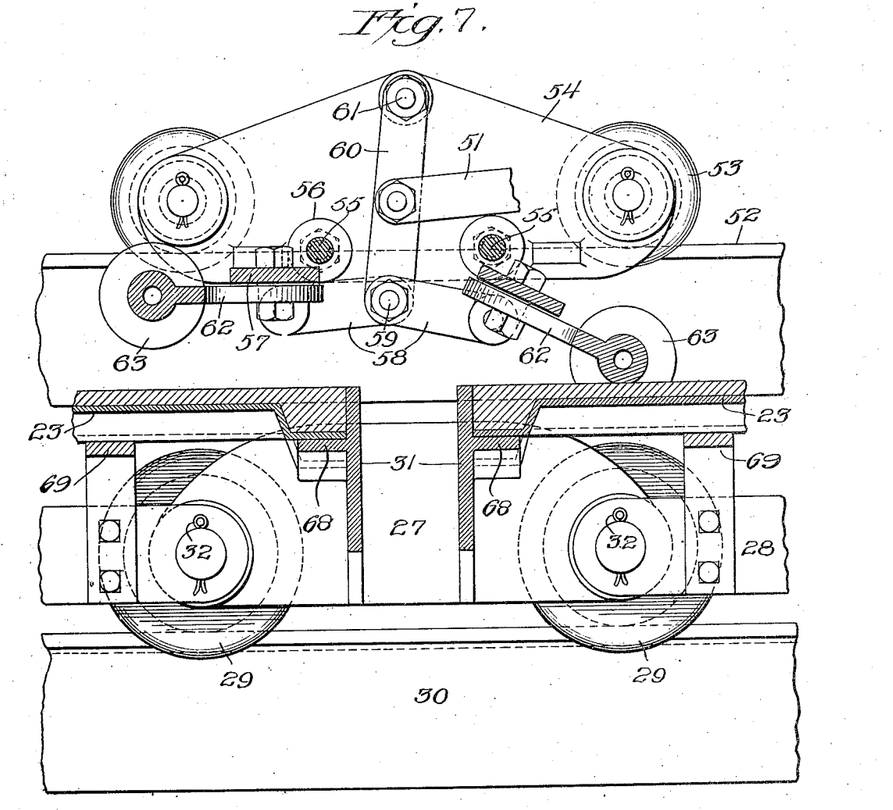
Fig. 7 is a detail, enlarged, of the smoothing trowels.
Figure 12:
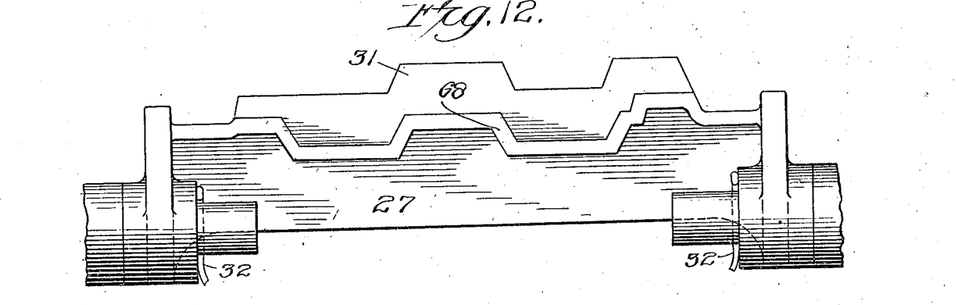
Fig. 12 is an end view of the carriage shown in Fig. 11.

A means for advancing the palettes into the various positions required for the molding operations is provided in the conveyer which I have designated as 22. The conveyer consists of a number of carriages 27 connected by links 28 and mounted on flanged wheels 29 arranged to travel upon guides 30. The carriages when linked together form an endless belt or conveyer adapted to travel around the wheels 21. Each carriage is suitably formed to receive between it and the adjacent carriage one of the palettes 23 (see Fig. 2), and carries upstanding profile walls 31, as shown best in Figs. 7 and 12, arranged to lie adjacent the ends of each palette, each wall being provided with a shelf 68 for supporting one end of a palette (see Fig. 7). The profile of each shelf corresponds closely to that of the under side of the palette which rests upon it, so as to form a seat on which the palette will be correctly positioned and held against sidewise shifting movement. By this means each palette is securely supported and correctly positioned upon the conveyer, and is provided at its ends with retaining walls which hold the material in place while being molded.

Extending transversely between opposite of the connecting links 28 are inverted U-straps 69 adapted to afford support for the palette (see Figs. 2 and 7) independent of that furnished by the shelves 68. In practice it is generally desired to make use at different times of sets of palettes differing greatly in profile. The machine should, therefore, be capable of operating with palette sets of any approved profile. For this purpose, the conveyer is built up of carriages having shelves 68 corresponding to the profiles of the palettes desired. The parts interconnecting the carriages of any conveyer are therefore so designed as to be readily detachable, so that the conveyer may be reconstructed with a set of carriages having the desired profile. This feature of my invention is most clearly exhibited in Fig. 19, where I have shown one of the flanged wheels 29 operatively mounted on a headed pivot pin 70 which extends through a bearing 71 near the end of the carriage 27 and through the proximate end of the connecting link 28. The head of the pivot pin 70 which engages with the outer side of the wheel 29, and a cotter pin 32 which extends through the other end of the pivot pin 70 to lie inside of the link 28, serve to maintain the parts securely in operative relation. Manifestly, a change of carriages may be made by simply pulling out the cotter pins, withdrawing the pivot pins to disassemble the conveyer, then reassembling with other carriages, and finally reinserting the pivot and cotter pins to lock the parts in place.

In operation, the palettes are placed one at a time upon the receiving end of the conveyer (see Fig. 2), where each finds support upon the straps 69 and one of the shelves 68. As the following carriage travels up and around the wheel 21, it brings its shelf into supporting position beneath the palette, and at the same time places its profile wall 31 against the rear end of the palette. When thus positioned upon the carriages between forward and rearward profile walls 31, the palette is centered upon the conveyer in proper position to be operated upon by the several mechanisms presently to be described. At the delivery end of the machine the profile wall 31 at the forward end of the palette moves away from the palette as the carriage starts downwardly to travel around the wheel 21. Although this movement of withdrawal from the forward end of the palette takes away the support of the forward shelf 68, nevertheless the palette will continue to remain in horizontal position for some little distance of travel owing to the support elsewhere afforded by the U-straps 69. Obviously when the forward profile wall has ceased to engage with the proximate end of the palette, the attendants may remove the palette from off the carriage without hindrance.

*The leveling mechanism.*

The materials to be molded may be discharged from a suitable supply source, as a hopper 33, onto the palettes 23, which are moved successively into position to receive the material. A vertically adjustable leveling gage 34 (best shown in Fig. 2), which forms the leveling device A, is arranged adjacent to the hopper at a proper height to scrape off of each palette material received from the hopper in excess of the quantity required for molding operations. This gage, which may be in the form of a shoe, is preferably profiled to correspond, in a measure at least, with that of the upper side of the finished product. It is apparent, therefore, that as each palette moves away from the hopper the gage 34 will act upon the material to bring it to a predetermined level and profile.

The tamping mechanism.

Figure 3:
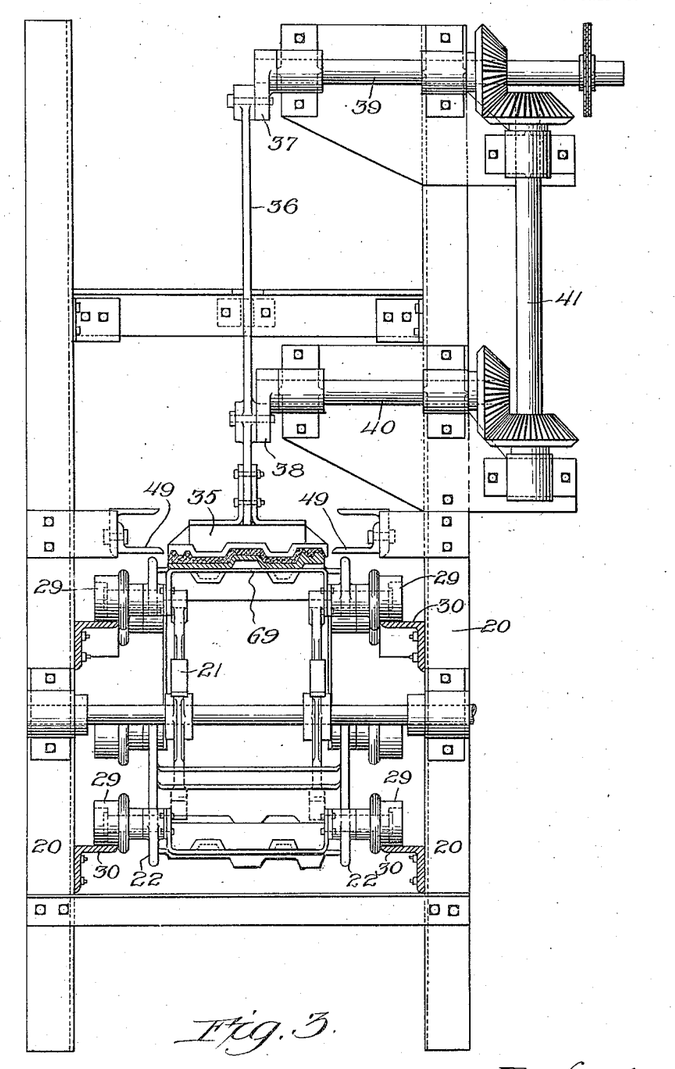
Fig. 3 is a transverse section taken on line 3—3 of Fig. 1, the hopper and leveling mechanism being removed from the view.

Upon leaving the leveling gage, the material is subjected to the action of a tamping device B (see Fig. 3) consisting of a shoe 35 of profile similar to that of the finished product, and vertically adjustable upon a rod 36 pivotally connected near its upper and lower ends to cranks 37 and 38 which are mounted on shafts 39 and 40 respectively. By any appropriate means, such as the connecting shaft 41 which is positively connected to each shaft 39 and 40, these latter shafts and cranks 37 and 38 are revolved in phase relation so as to maintain the rod 36 vertical at every point in its cycle of movement. Power is transmitted to the shaft 39 to effect the movements described which should proceed in a clockwise direction, as viewed in Fig. 1, and at a speed sufficient to enable the tamping shoe to repeat its action upon every portion of the material carried on the palette. By properly adjusting the tamping shoe, the material may be compressed to the desired density, and at the same time will receive the form which it is to finally take. It will be observed that the tamping shoe operates upon the material while executing a curved movement in the same direction as the travel of the palette, and for this reason the material is not displaced, piled up, or scraped off to any extent, but only compressed to the degree required by the vertical position of the tamping shoe relative to the rod 36.

The troweling mechanism.

Figures 4, 5:
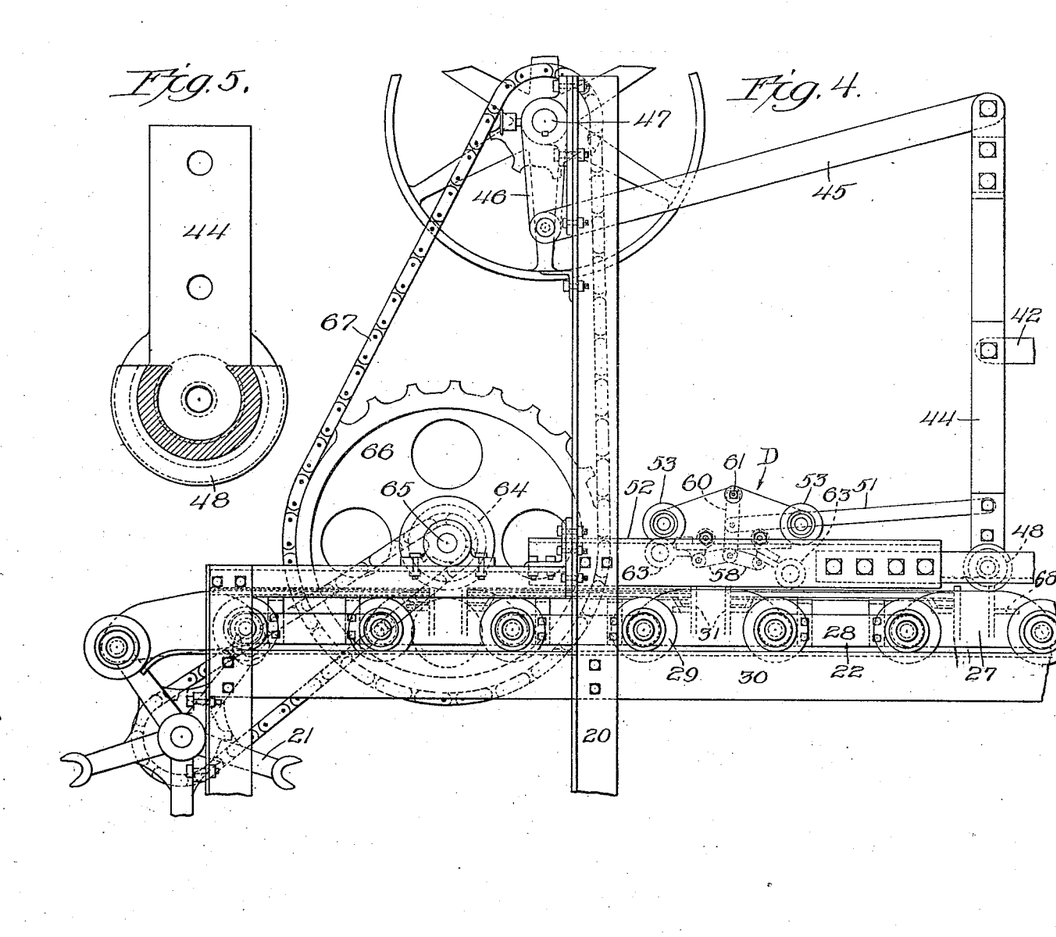
Fig. 4 is an enlarged side elevation of the delivery end of the machine.
Fig. 5 is a detail of the reciprocating cylindrical trowel.
Figure 6:
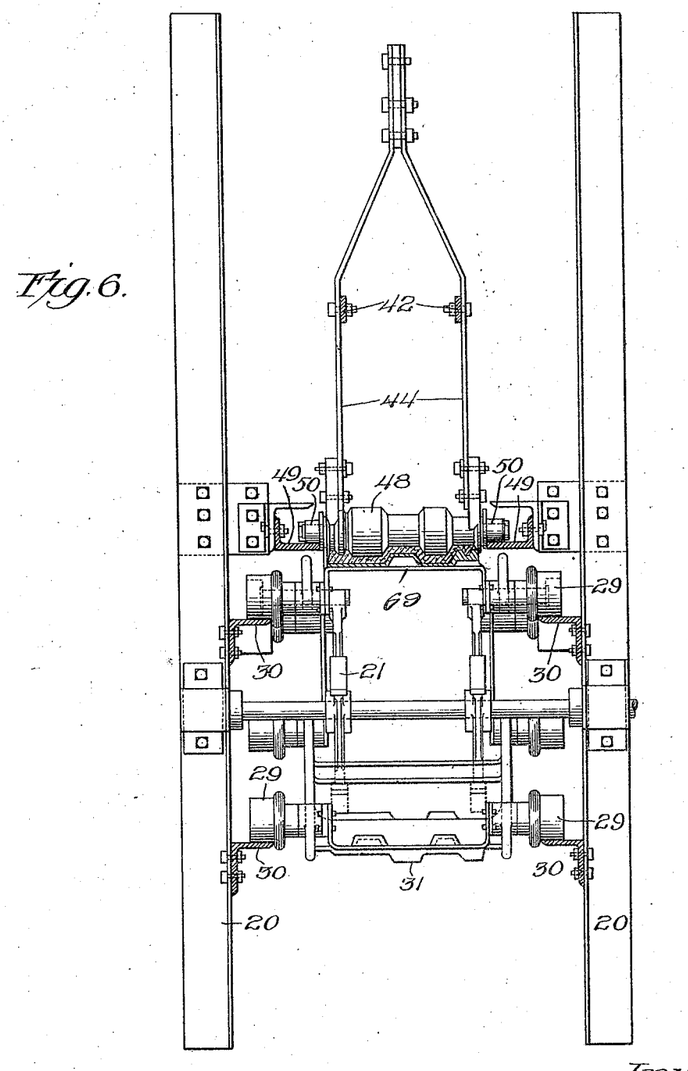
Fig. 6 is a transverse section, taken on line 6—6 of Fig. 1.

After receiving treatment from the tamping mechanism which compresses the material to the desired density, the material still on the palette is conveyed into position to be operated upon by the troweling mechanism C. As appears best in Figs. 1 and 6, this consists of a pair of vertically movable links 42 pivoted to the frame as at 43 and to yoked rocking arms 44 whose upper ends are pivotally secured to a link 45 having connection with a crank 46 mounted on a driven shaft 47. At their lower ends the rocking arms 44 carry a cylindrical profile trowel 48 which is reciprocated with each stroke of the links 45 back and forth over the material being molded. This trowel 48 is suitably rounded as shown in Fig. 5, and need not be mounted to rotate when in action. The troweling cylinder 48 moves always in a straight horizontal line owing to the vertically adjustable mounting of the link 42 to which the arm 44 is fulcrumed, and this movement is further confined by means of guideways 49, one on each end of the cylindrical trowel 48, with which flanged rollers 50 coöperate. In operation the material under treatment is subjected to the weight of the reciprocating trowel which, with its associated parts, may be sufficiently heavy to produce the desired results. The trowel is maintained always at the correct level for operation upon the material by means of the guideways 49, which are so mounted on the frame as to be capable of adjustment as required by the nature and thickness of the product being molded.

The smoothing mechanism.

Figure 8:
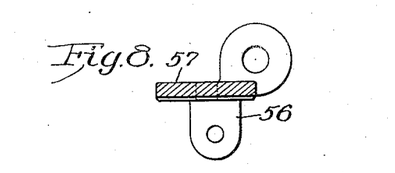
Fig. 8 is a detail of one of the link members in the trowel shown in Fig. 7.
Figure 9:
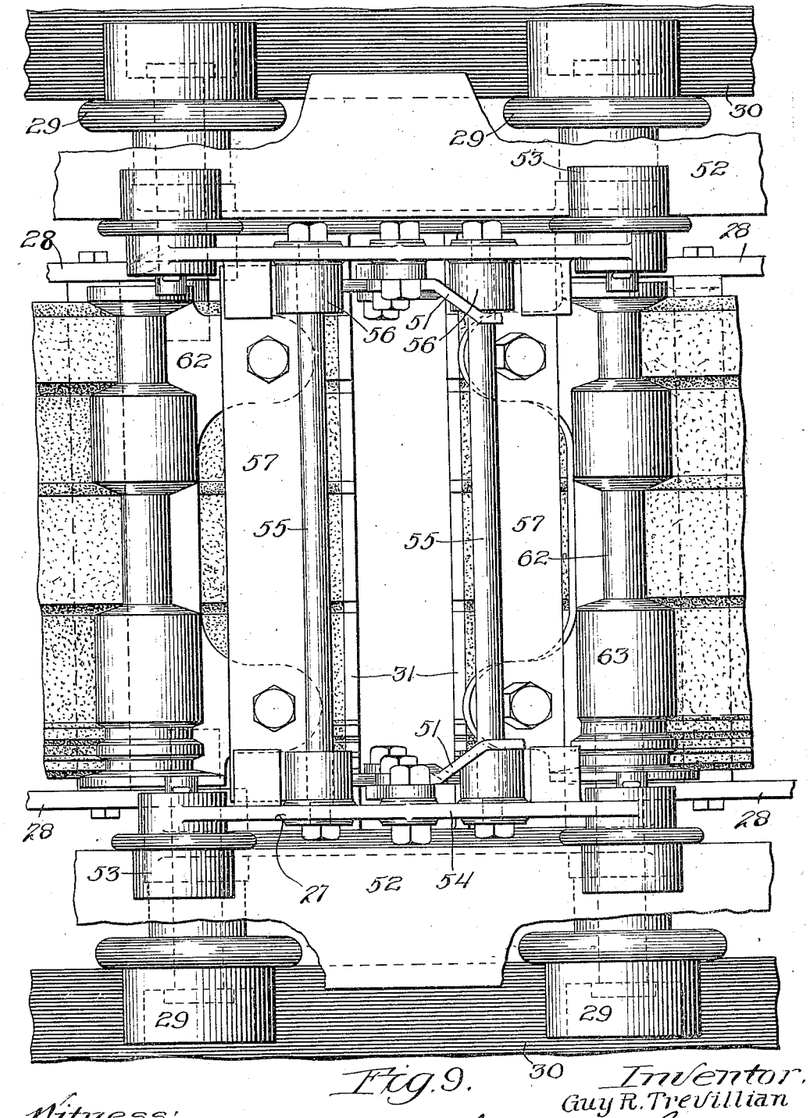
Fig. 9 is a plan view of the parts shown in Fig. 7.

Connected to the arm 44 by links 51, and receiving its motion therefrom, is a device for smoothing off the surface of the material, which I have termed the smoothing mechanism D. The construction and operations of this device may best be understood by reference to Figs. 4, 7, 8, and 9, wherein I have shown tracks 52 with which flanged wheels 53 coöperate, these wheels supporting a carriage 54 in position to be reciprocated above the surface of the material being molded. Extending transversely across the carriage are two rods 55 to each of which are pivotally secured two link members 56 (see Fig. 8) connected to a bar 57. The lower end of each link member is pivotally connected to another link 58 having connection as at 59 with a swinging bar 60 pivoted to the carriage as at 61. Bolted or otherwise secured to each bar 57 is a plate 62 formed at its edges with a profile trowel 63 suitably rounded to perform work upon the material being molded. In operation, the reciprocating movements of the arms 44 are communicated through the links 51 to the bars 60, to which they are connected, causing the link members 56 to be swung simultaneously, one toward, and the other away from, the work. By these movements, the profile trowels 63 are brought alternately into engaging position with the material to render its surface smoother and denser. During each stroke the carriage 54 is also reciprocated upon its wheels 53, in consequence of which its movements relative to the material under treatment will be faster in one direction than in the other, owing to the continuous advancement of the material in a single direction. The tracks 52 are so mounted upon the frame that they may be adjusted vertically whenever required for taking up wear, or for other reasons.

The finishing mechanism.

Figure 10:
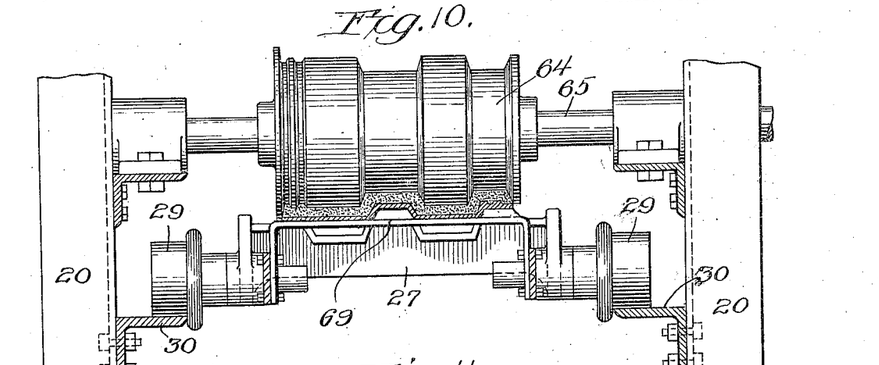
Figs. 10 and 11 are cross sectional details showing the conveyer carriage and the finishing roll.
Figure 11:
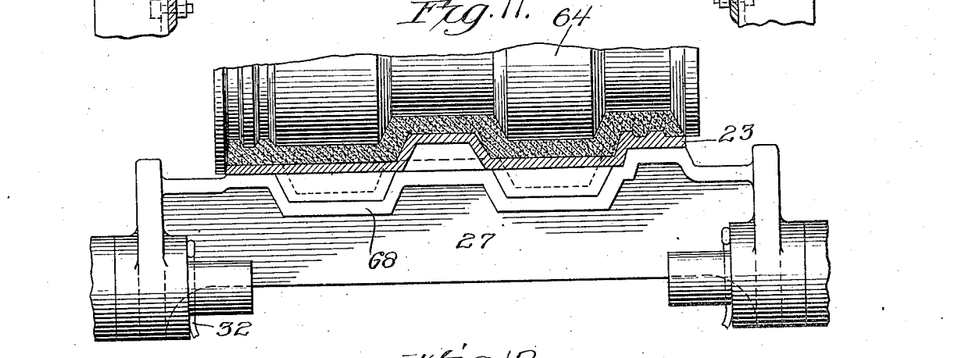

When the smoothing device has performed its work, the material will be ready to undergo the final operation. This is performed by the finishing mechanism designated as E, and represented in detail in Figs. 10 and 11. As shown, this device consists of a smooth profile roll 64 mounted on a rotatable shaft 65, adjustable toward or from the work and driven through suitable transmission such as the sprocket wheel 66 and chain 67. Preferably the roll is revolved at a comparatively low speed in a direction counter to that of the travel of the product at the point of contact, so as to produce a very smoothly finished surface. The ends of the roll are each flanged as at 72, being arranged in coinciding relation with the sides of the palette, so as to shear off the edges of the product in a smooth manner. Where desired, the surface of the work may be sprayed or sprinkled with an atomizer to increase the smoothness of the finish and preferably this would be done immediately prior to treatment by the finishing roll. After having passed under the finishing roll, the product upon its palette is removed and placed away to cure or dry.

The various mechanisms which have been described are driven from any appropriate power source, and are suitably timed to operate relative to each other and to the products under treatment, so as to produce most satisfactory results. It is further to be noted that the various agencies which perform work on the materials may be adjusted within certain limits toward or from the work, according as conditions may require, it being generally desirable that each succeeding mechanism, in the order of their operations, shall be arranged slightly closer to the work than those preceding. Also I would have it understood that under certain conditions one or more of the mechanisms described may be dispensed with, or altered in its operation, if the nature of the product under treatment should justify this change. My invention is principally concerned with an apparatus of the general kind herein shown in which the plastic material is treated by several agencies in succession and automatically transformed from a loose amorphous condition into a product having a predetermined form, finish, and density.

I claim:

1. In an apparatus of the kind described, the combination of means for advancing palettes containing material thereon through a number of positions, a plurality of mechanisms arranged to operate successively upon the material as the same is advanced comprising a circularly moving tamping device, a reciprocating troweling device, a reciprocating smoothing device, and a revolving finishing device, and means for timing the operations of the said mechanisms to predetermined relative speeds, substantially as described.

2. In an apparatus of the kind described employing palettes on which the material is carried, means for advancing the palettes, and mechanism for tamping the material consisting of a member having a working face flat lengthwise of the machine and profiled crosswise thereof to correspond with the configurations desired for the upper surface of the product, and means for imparting to the member a curved movement without altering the angular position of its working face and which, during a portion of its cycle, brings the member into contact with the material to tamp the same, the direction of travel of the member and the material being the same at the moment of contact, substantially as described.

3. In an apparatus of the kind described employing palettes on which the material is carried, means for advancing the palettes at a predetermined speed, and mechanism stationary with respect to the palettes for tamping the material consisting of a member having a working face flat lengthwise of the machine and profiled crosswise thereof to correspond with the configurations desired for the upper surface of the product, and means for imparting to the member a curved movement without altering the angular position of its working face and which, during a portion of its cycle, brings the member into contact with the material to tamp the same, the same means operating to time the movements of the member to repeat its tamping action upon the material at substantially every point longitudinally of the palette, substantially as described.

4. In an apparatus of the kind described employing palettes on which the material is carried and advanced through the apparatus, a troweling member profiled to correspond with the configurations desired for the upper surface of the product, means for reciprocating the troweling member back and forth over the surface of the material at a fixed height relative to a palette, and other means for smoothing the surface of the material after it has passed from contact with the troweling member, said latter means being arranged to reciprocate over the surface of the material at a fixed height relative to a palette, there being means connecting the troweling member and smoothing means by which a reciprocating motion is imparted from one to the other, substantially as described.

5. In an apparatus of the kind described employing palettes on which the material is carried, means for smoothing the upper surface of the material consisting of a reciprocating carriage arranged above a palette, means for reciprocating the carriage, two members mounted on the carriage each profiled to correspond with the configurations desired for the upper surface of the product, and means for bringing the two members alternately into contact with the surface of the material, one with each reciprocating stroke of the carriage, substantially as described.

6. In an apparatus of the kind described employing palettes on which the material is carried, means for smoothing the upper surface of the material consisting of a carriage arranged to be reciprocated over the material, two members mounted on the carriage arranged to be brought into contact one at a time with the surface of the material, and a single means for imparting reciprocating movements to the carriage and for alternately bringing the two members into contact with the material, substantially as described.

7. In an apparatus of the kind described, a plurality of mechanisms for operating upon the surface of the material to transform the same from an amorphous condition to a product having a definite form, including a plurality of members arranged to be moved for operation successively upon the surface of the material, each of the said members, in the order of their operations upon the material, being adjusted closer to the material, substantially as described.

8. In an apparatus of the kind described employing palettes on which the material is contained and a plurality of mechanisms profiled to correspond with the configurations desired for the upper surface of the product each arranged to operate successively upon the material, a conveyer for advancing the material through positions to be successively operated upon by the said mechanisms, the conveyer including means for positively centering each palette in correct position relative to the mechanisms which operate upon the material and providing walls to abut against the ends of the palette to retain the material, each of the walls being profiled to substantially correspond with the profiles in the mechanisms operating upon the material, substantially as described.

9. In an apparatus of the kind described employing palettes profiled to correspond with the configurations desired for the under surface of the product, a conveyer for advancing the palettes into successive contact with different mechanisms, each of which is profiled to correspond with the configurations desired for the upper surface of the product, the conveyer including a plurality of linked carriages arranged to receive a number of palettes, there being members mounted on the carriages arranged to lie at each end of each palette, and each of such members being profiled to substantially correspond with the profiles of the mechanisms operating upon the material, substantially as described.

10. In an apparatus of the kind described employing molding palettes having retaining walls at their ends only, a series of mechanisms for operating upon the material carried upon the palettes, one of the mechanisms consisting of a roll having end flanges arranged in coinciding relation with the sides of the palette to shear off the material carried thereby, whereby the sides of the product are definitely formed, substantially as described.

11. An apparatus of the kind described including, in combination, a palette conveyer consisting of a plurality of wheeled carriages linked together to form an endless chain and suitably mounted for operation, each carriage being provided with a transverse wall adapted to lie against the end of a palette, and with a shelf extending laterally from the wall to afford support for the end of a palette, each of the link connections between the carriages being provided with transversely extending brackets adapted to afford support for a palette independent of that furnished by the shelves, substantially as described.

12. An apparatus of the kind described including, in combination, a palette conveyer consisting of a plurality of wheeled carriages linked together to form an endless chain and suitably mounted for operation, each carriage being provided near its center portion with two transverse walls, the forward wall being adapted to lie against the rear end of a palette and the rear wall being adapted to lie against the forward end of the succeeding palette, shelves extending laterally from each wall adapted to afford support for the ends of the proximate palettes, the shelves being profiled to correspond with the profiles of the palettes whereby shifting movement of the palettes upon the shelves is prevented, and transversely extending brackets carried by each connecting link, one near each end thereof, adapted to afford support for a palette near its center portion independent of that furnished its ends by the shelves, substantially as described.

13. An apparatus of the kind described including, in combination, a palette conveyer consisting of a plurality of wheeled carriages linked together to form an endless chain, and suitably mounted for operation, each carriage being provided near its center portion with two transverse walls, the forward wall being adapted to lie against the rear end of the palette and the rear wall being adapted to lie against the forward end of the succeeding palette, shelves extending laterally from each wall adapted to afford support for the ends of the proximate palettes, and transversely extending brackets carried by each connecting link, one near each end thereof, adapted to afford support for a palette near its center portion independent of that furnished its ends by the shelves, substantially as described.

14. An apparatus of the kind described including, in combination, a palette conveyer consisting of a plurality of wheeled carriages linked together to form an endless chain and suitably mounted for operation, mountings for the palettes upon the carriages and links arranged to support the palettes in position centrally between the carriages, and means formed upon the mountings for centering each palette in proper operative position, substantially as described.

15. An apparatus of the kind described including, in combination, a palette conveyer consisting of a plurality of wheeled carriages linked together to form an endless chain and suitably mounted for operation, and mountings for the palettes upon the carriages and links arranged to support the palettes in position centrally between the carriages, substantially as described.

16. An apparatus of the kind described including, in combination, a palette conveyer consisting of a plurality of wheeled carriages linked together to form an endless chain and suitably mounted for operation, mountings for the palettes upon the carriages and links arranged to support the palettes in position centrally between the carriages, the mountings on the carriages being adapted to coöperate with the palettes of a given profile to center the same in operative position upon the conveyer, and detachable connections between each of the carriages and links for facilitating substitution of different carriages for operation with palettes of different profile, substantially as described.

17. An apparatus of the kind described employing molding palettes, a series of mechanisms for operating upon the material carried upon the palette, one of the mechanisms consisting of a roll having flanges arranged in coinciding relation with the sides of the palette to shear off the material carried thereby, whereby the sides of the product are definitely formed, substantially as described.

18. An apparatus of the kind described including, in combination, a palette conveyer consisting of a plurality of wheeled carriages linked together to form an endless chain and suitably mounted for operation, and mountings for the palettes upon the carriages and links arranged to support the palettes in position intermediately of the carriages substantially as described.

GUY R. TREVILLIAN.